United States Patent
Conley et al.

(10) Patent No.: US 10,963,201 B1
(45) Date of Patent: Mar. 30, 2021

(54) SYSTEM, APPARATUS, AND METHOD FOR MINIMIZING THE IMPACT OF DELAYS IN PRINTING PATH SCHEDULES

(71) Applicant: Xerox Corporation, Norwalk, CT (US)

(72) Inventors: John H. Conley, Rochester, NY (US); Norman E. Wright, Rochester, NY (US); Mark McKrell, Webster, NY (US); Jennifer Anglum, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/662,324

(22) Filed: Oct. 24, 2019

(51) Int. Cl.
*G06F 3/12* (2006.01)
*H04N 1/00* (2006.01)
*G06K 15/02* (2006.01)

(52) U.S. Cl.
CPC .......... *G06F 3/1267* (2013.01); *G06F 3/1212* (2013.01); *G06F 3/1261* (2013.01)

(58) Field of Classification Search
None
See application file for complete search history.

(56) References Cited

U.S. PATENT DOCUMENTS

| | | | | |
|---|---|---|---|---|
| 5,095,342 A * | 3/1992 | Farrell | ................. | G03G 15/234 355/23 |
| 5,095,369 A * | 3/1992 | Ortiz | ..................... | G03G 15/50 358/296 |
| 5,159,395 A * | 10/1992 | Farrell | ................. | G03G 15/234 271/291 |
| 5,335,056 A * | 8/1994 | Muramatsu | ........ | G03G 15/0131 399/223 |
| 5,337,135 A * | 8/1994 | Malachowski | ...... | G03G 15/234 271/270 |
| 2005/0088670 A1* | 4/2005 | Folkins | .................. | G03G 15/50 358/1.4 |
| 2010/0221024 A1* | 9/2010 | Funayama | ......... | G03G 15/0131 399/46 |
| 2012/0002230 A1* | 1/2012 | Yamazaki | ............ | B41J 13/0009 358/1.13 |
| 2013/0033535 A1* | 2/2013 | Dejong | ................ | H04N 1/0473 347/14 |
| 2014/0240381 A1* | 8/2014 | Fujimoto | ............. | B41J 13/0009 347/5 |
| 2018/0056679 A1* | 3/2018 | Vestjens | ................. | B65H 29/60 |

\* cited by examiner

*Primary Examiner* — Beniyam Menberu
(74) *Attorney, Agent, or Firm* — Simpson & Simpson, PLLC; Michael Nicholas Vranjes (57) ABSTRACT

A method of operating a printing system according to a printing path schedule, the printing system including a duplex loop including a plurality of pitches with each pitch of the plurality of pitches operatively arranged to carry one sheet, the method including receiving input data related to one or more images to be printed, preparing a printing path schedule based on the input data, receiving an indication of the delay in the printing system, determining whether the delay is equal to a multiple of a whole pitch of the plurality of pitches, and if the delay is not equal to a multiple of a whole pitch of the plurality of pitches, adjusting the printing path schedule.

20 Claims, 4 Drawing Sheets

SYSTEM, APPARATUS, AND METHOD FOR MINIMIZING THE IMPACT OF DELAYS IN PRINTING PATH SCHEDULES

FIELD

The present disclosure relates to the field of schedulers for printing, and more particularly, to a method of adjusting duplex printing path schedules to minimize the effect of delays.

BACKGROUND

To become a duplex print, a sheet enters the marker paper path. Its front side receives an image, it traverses the duplex loop, and its back side receives an image. A timeline for this process may be shown, for example, as follows: f - - - - d; with "f" representing the front side image and "d" representing the back side image. In the example shown above, f and d are separated by the duplex loop time, which is equivalent to the process length of four sheets. Thus, "-" represents one sheet. Each of f, d, and - represent a single "pitch," or a space on the duplex loop in which one whole sheet fits (i.e., a sheet space). As such, in some embodiments, the entire marker paper path may comprise five pitches, e.g., f - - - -, with d beginning the new set of five pitches. In some embodiments, the entire marker paper path may comprise one or more pitches (e.g., seventeen pitches).

A scheduler arranges for a sheet to be delivered to the marker paper path as soon as possible. This typically means that it occupies positions in the marker paper path that are immediately adjacent to the preceding and succeeding sheets. The front f and back d sides of the sheet thus define a timeline for the maximum number of sheets, or pitches, that can be located between them. As an example, the scheduler may deliver five sheets to the marker paper path for a front f image. The five sheets all enter an inverter arranged in the duplex loop, are inverted, and then traverse the duplex loop to receive a back d image. The schedule of such events may be shown, for example, as follows:

fffffddddd

Thus out of a total of five possible pitches (i.e., sheet locations within the marker paper path), five sheets are fed for their front f images, then the scheduler stops delivering additional sheets to the marker paper path until the five sheets traverse the duplex loop to obtain their back d image. Duplex and simplex printing, scheduling of duplex and/or simplex printing, and the concept of pitches is described in U.S. Pat. No. 5,696,893 (Fromherz et al.), U.S. Pat. No. 5,504,568 (Saraswat et al.), and U.S. Pat. No. 9,904,493 (Conley), which references are incorporated herein by reference in their entireties.

Delays may occur that increase the time between sheets (i.e., delay the time that the scheduler delivers a sheet to the marker paper path). For example, from a late print job submission when streaming, a shift between paper feeders, an adjustment to the marker, additional time needed by a finisher or other downstream device, a delay in submission between print jobs, a mix of duplex and simplex jobs, etc. A sheet delayed for a whole number of sheet durations (or a whole number of pitches) will cost only that amount of time because subsequent sheets will fill in the later gaps. For example, a gap created between the first back side $d_1$ and the second back side $d_2$ can be used by the later front side $f_5$. This example may be shown as:

$f_1$ X $f_2$ $f_3$ $f_4$ $d_1$ $f_5$ $d_2$ $d_3$ $d_4$ $f_6$ $d_5$ with "X" being a delay that represents one full pitch.

If the delay is not a whole multiple of the sheet time or pitch, lost time will proliferate through the schedule. In this example, the timeline between the front and back of the third sheet, which is delayed, is out of phase with the timeline of the previous sheet by a half sheet. This example may be shown as:

$f_1$ $f_2$ X $f_3$ $d_1$ $d_2$ X x $d_3$ with "X" representing one whole sheet space or pitch and "x" representing a fraction of one whole sheet space or pitch (e.g., a half sheet space or pitch).

Since sheets are scheduled to enter the marker paper path as soon as possible, sheet four, the next sheet, will follow the earlier timeline through the duplex path. However, its timeline contains the delayed back side of sheet three, which is out of phase. This example, which is combined with the above example, may be shown as:

$f_1$ $f_2$ X x $f_3$ x $d_1$ $d_2$ $f_4$ x $d_3$ X X x $d_4$

This example may also be shown as:

$f_1$ $f_2$ $\underline{1.5}f_3$ $\underline{0.5}$ $d_1$ $d_2$ $f_4$ $\underline{0.5}$ $d_3$ $\underline{2.5}$ $d_4$ with the values between sheets expressing time in numbers of sheets or pitches. The next sheet five will follow the timeline of sheet three, but includes the out-of-phase back side of sheet four:

$f_1$ $f_2$ X x $f_3$ x $d_1$ $d_2$ $f_4$ x $d_3$ $f_5$ X x $d_4$ X x $d_5$

This example may also be shown as:

$f_1$ $f_2$ $\underline{1.5}$ $f_3$ $\underline{0.5}$ $d_1$ $d_2$ $f_4$ $\underline{0.5}$ $d_3$ $f_5$ $\underline{1.5}$ $d_4$ $\underline{1.5}$ $d_4$ $\underline{1.5}$ $d_5$ with the values between sheets expressing time in numbers of sheets or pitches. As long as successive timelines are out of phase, the utilization of one sheet space or pitch is lost on each loop through the duplex path. The above example(s) exhibits full burst duplex scheduling, where the maximum number of front f sides are followed by the back d sides. Thus, the maximum number of sheets that will fit within the marker paper path is delivered thereto with each sheet receiving a front f image, and the scheduler does not deliver any additional sheets until each of the sheets already delivered to the marker paper path receives a back d image. This may be shown as:

$f_1$ . . . $f_2$ . . . $f_3$ . . . $f_4$ . . . $f_5$ . . . $d_1$ . . . $d_2$ . . . $d_3$ . . . $d_4$ . . . $d_5$

In another example, the scheduler alternates single front f sides and back d sides. Sheets are scheduled to enter the marker paper path for a front f side image separated by a one-sheet (or one-pitch) gap, which gap is intended for a back d side image. This may be shown as:

$f_1$ _ $f_2$ _ $f_3$ $d_1$ $f_4$ $d_2$ $f_5$ $d_3$ with "_" indicating a purposeful full-sheet or full-pitch gap (i.e., the scheduler delivered the gap _ intentionally). Notice should be given to the fact that back sides $d_1$ and $d_2$ fill the gaps left in the marker paper path.

Entry delays impose persistent gaps in the alternating mode similar to that of the full burst mode, as the following example shows:

$f_1$ _ x $f_2$ _ x $d_1$ _ x $d_2$ with "_" indicating a purposeful full sheet space/pitch gap and "x" indicating a fraction of a sheet space/pitch delay (e.g., a half sheet space/pitch). The above example with the addition of sheet three is shown below:

$f_1$ _ x $f_2$ _ x $d_1$ $f_3$ x $d_2$ _ _ x $d_3$

The above example with the addition of sheet four is shown below:

$$f_1 \_ x\ f_2 \_ x\ d_1\ f_3\ x\ d_2\ f_4 \_ x\ d_3 \_ x\ d_4$$

After the fractional delay of sheet two, the time for one sheet is lost on each subsequent loop of the duplex path.

As noted above, delays can happen between sheets belonging to different jobs. The scheduler could let the marker paper path clear out before running the second job, which might be effective overall if the job is long enough. However, numerous unpredictable delays can occur within a job due to interactions between the printer and the scheduler. Running out the marker paper path for each of these would lead to unacceptable productivity.

Additionally, such a problem with delays does not exist when the marker paper path is synchronized with a photoreceptor belt, since sheets will be separated by a multiple of the image frame size. Absent a photoreceptor, the scheduler could impose a layout on the marker paper path as though synchronizing with one. However, this assumes that the time between a front and back side is a whole multiple of the sheet time, which is not always the case.

Thus, there is a long felt need for a system and method for reducing the impact of delays in duplex printing path schedules by adjusting the schedule such that the delay represents a whole sheet space or pitch rather than a fraction of a sheet space or pitch.

SUMMARY

According to aspects illustrated herein, there is provided a method of operating a printing system according to a printing path schedule, the printing system comprising a duplex loop including a plurality of pitches with each pitch of the plurality of pitches operatively arranged to carry one sheet, the method comprising receiving, by one or more computer processors, input data related to one or more images to be printed, preparing, by the one or more computer processors, a printing path schedule based on the input data, receiving, by the one or more computer processors, an indication of the delay in the printing system, determining, by the one or more computer processors, whether the delay is equal to a multiple of a whole pitch of the plurality of pitches, and if the delay is not equal to a multiple of a whole pitch of the plurality of pitches, adjusting, by the one or more computer processors, the printing path schedule.

According to aspects illustrated herein, there is provided a computer system for operating a printing system according to a printing path schedule, comprising a printing system, comprising a duplex loop including a plurality of pitches, each pitch of the plurality of pitches operatively arranged to carry one sheet, an inverter, and at least one feeder, one or more computer processors, one or more computer readable storage media, program instructions stored on the computer readable storage media for execution by at least one of the one or more computer processors, the program instructions comprising program instructions to receive input data related to one or more images to be printed, program instructions to prepare a printing path schedule based on the input data, program instructions to receive an indication of the delay in the printing system, program instructions to determine whether the delay is equal to a multiple of a whole pitch of the plurality of pitches, and program instructions to, if the delay is not equal to a multiple of a whole pitch of the plurality of pitches, adjust the printing path schedule.

According to aspects illustrated herein, there is provided a computer program product for operating a duplex printing system according to a duplex printing path schedule, the printing system comprising a duplex loop including a plurality of pitches with each pitch of the plurality of pitches operatively arranged to carry one sheet, the computer program product comprising a computer readable storage medium and program instructions stored on the computer readable storage medium, the program instructions comprising program instructions to receive input data related to one or more images to be printed, program instructions to prepare a printing path schedule based on the input data, wherein the printing patch schedule comprises one of a full burst printing mode and an alternating printing mode, program instructions to receive an indication of the delay in the printing system, program instructions to determine whether the delay is equal to a multiple of a whole pitch of the plurality of pitches, and program instructions to, if the delay is not equal to a multiple of a whole pitch of the plurality of pitches, adjust the printing path schedule by adding an intentional gap in the printing path schedule, wherein the addition of the delay and the intentional gap is equal to a multiple of a whole pitch.

According to aspects of the present disclosure, the scheduler detects misaligned delays whenever it schedules a duplex sheet for printing. The misaligned condition is that: 1) the new front side f occurs before the last scheduled back side d; and, 2) the new back side d is offset from the last scheduled back side by a fractional number of sheet times. The scheduler corrects the misalignment by rounding up the new back side d time to a whole number of sheet times or pitches. Since no fractional delays will then subsequently occur, the cost is limited to the point of delay (i.e., the correction). In the full burst example described above, the third sheet delay is increased by a half sheet, which keeps the timelines in equal phase. The original example of the delay in full burst mode is shown below:

$$f_1\ f_2\ X\ x\ f_3\ x\ d_1\ d_2\ f_4\ x\ d_3\ f_5\ X\ x\ d_4\ X\ x\ d_5$$

To correct the fractional (e.g., half) sheet space/pitch delay, the scheduler issues an additional intentional delay to round the fractional sheet space/pitch up to a whole sheet space/pitch. Thus the additional intentional delay (hereinafter "a") is calculated: $a = 1-x$, wherein "a" is a fraction of a pitch, "x" is a fraction of a pitch, and $a+x=$ one whole pitch. Thus, the correction of the example shown above by the scheduler may be shown as:

$$f_1\ f_2\ X\ x\ f_3\ x\ d_1\ d_2\ f_4\ f_5\ d_3\ X\ x\ a\ d_4\ d_5$$

In the alternating duplex mode, the scheduler rounds to the next double sheet (i.e., 2 pitches) boundary, since rounding to the next sheet could still leave timelines out of phase. In the problem example, the next sheet boundary would be two full sheets or pitches, up from one and one half. Using the lead edge time of the front side f of sheet one as a reference, front sides f occur at even offsets in the sheet 1 timeline and at odd offsets in the sheet 2 timeline. Back side d offsets are the opposite, which means that they occupy front side f positions in overlapping timelines. For example, the time used by the back side d of sheet 1 would have been valid for a future front side f. The original example of the delay in alternating mode is shown below:

$$f_1 \_ x\ f_2 \_ x\ d_1\ x\ d_2$$

The correction of the example shown above by the scheduler may be shown as:

$$f_1 \_ x\ a\ f_2 \_ d_1 \_ x\ a\ d_2$$

The next earliest time for sheet three is one sheet length after the end of sheet two, which is not valid because the front side overlaps with the backside of sheet one. Moving out one more sheet length succeeds, but now sheet three defines a timeline with one of the front side positions filled in, this time by the back side of sheet two. Trying sheet four at the next earliest time fails due to this overlap. Similarly, moving out one sheet works but sets up a similar future conflict. Each sheet will be delayed by one sheet length because of this recurring conflict. An example of this is shown below:

$$f_1 \_ x \ a \ f_2 \_ d_1 \ f_3 \_ d_2 \ f_4 \_ d_3 \ f_5 \_ d_4 \_ \_ d_5$$

However, rounding to the next double sheet boundary adds one to the offset of the sheet two timeline, bringing it in line with sheet one. The cost of the delay is thus confined to the point of delay. This can be shown as follows:

$$f_1 \_ x \ a \_ f_2 \_ d_1 \ f_3 \_ f_4 \_ d_2 \ f_5 \ d_3 \_ d_4 \_ d_5$$

It should be appreciated that although time may be available at the next sheet boundary in the marker's portion of the paper path, other machine modules might have constraints that prevent using it. Therefore, the rounding process by the scheduler is iterative.

It should be further appreciated that when simplex and duplex sheets occur together in the paper path, fractional delays will appear due to normal timing constraints. In that case, this method can impair productivity. Therefore, in some embodiments, the scheduler may not apply the method of the present disclosure when the path intermixes plex (i.e., simplex and duplex printing), or when mixed sheet sizes are present.

A benefit of the present disclosure is its simplicity. Existing scheduling constraints on sheet alignment are either ad hoc (i.e., use the next available time), or rely on a reference that is external to the paper path (e.g., the photoreceptor belt). The present disclosure solves the problem with the ad hoc method without superfluous modelling, but rather it only relies on the state of the marker paper path.

The present disclosure is a new kind of timing constraint that is sensitive to context in the sense that other constraints can influence the values that it allows. Once imposed however, it is always effective. The constraint of the present disclosure applies itself based on context of the paper path, and may be switched off when such constraint would be counterproductive.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

"Printer," "printer system," "printing system," "printer device," and "printing device" as used herein encompass any apparatus, such as a digital copier, bookmaking machine, facsimile machine, multi-function machine, etc., which performs a print outputting function for any purpose. Furthermore, as used herein, "sheet," "web," "substrate," and "printable substrate" refer to, for example, paper, transparencies, parchment, film, fabric, plastic, photo-finishing papers or other coated or non-coated substrate media in the form of a web upon which information or markings can be visualized and/or reproduced.

Figure 1:
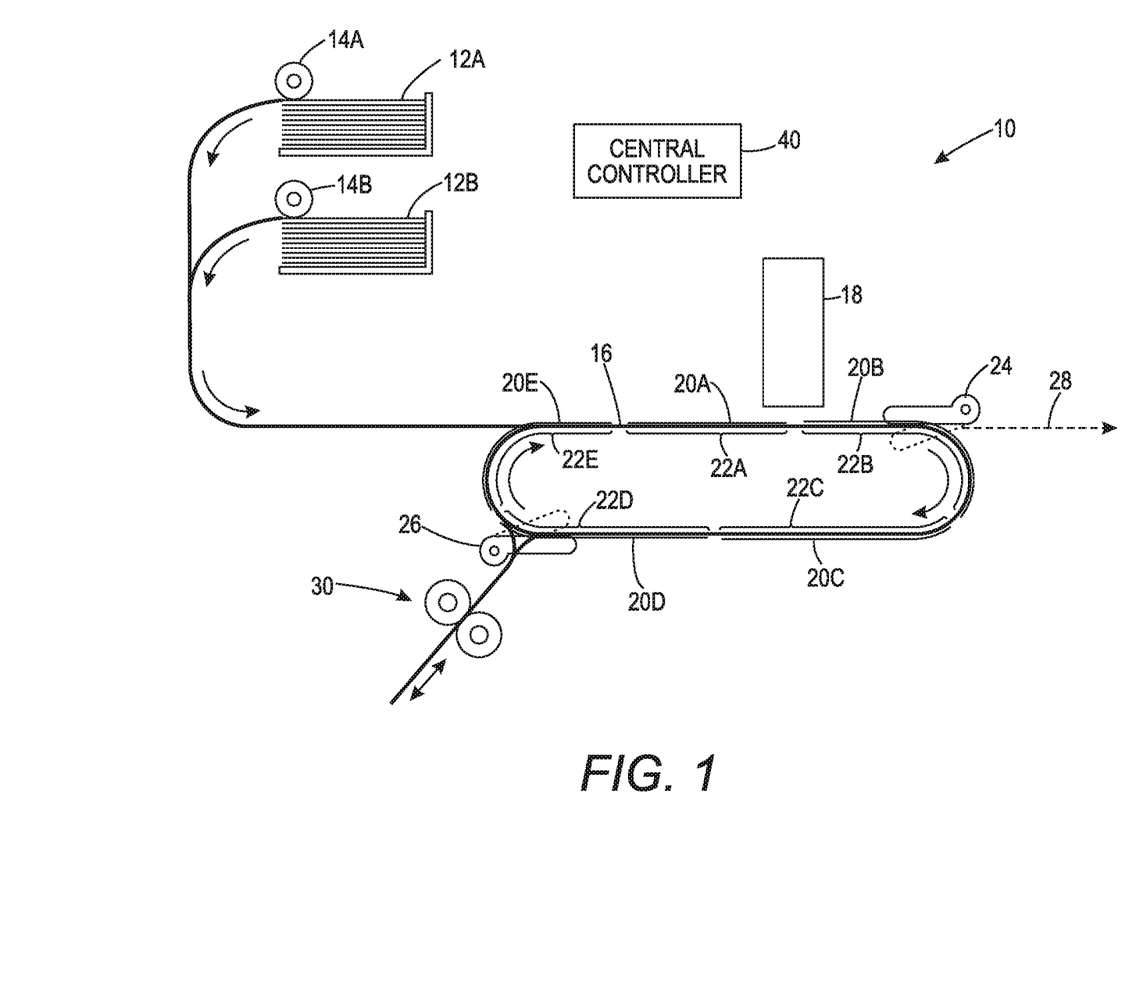
FIG. 1 is a simplified elevational view showing the relevant parts of a duplex printing system, in accordance with some embodiments of the present disclosure.
Figure 2:
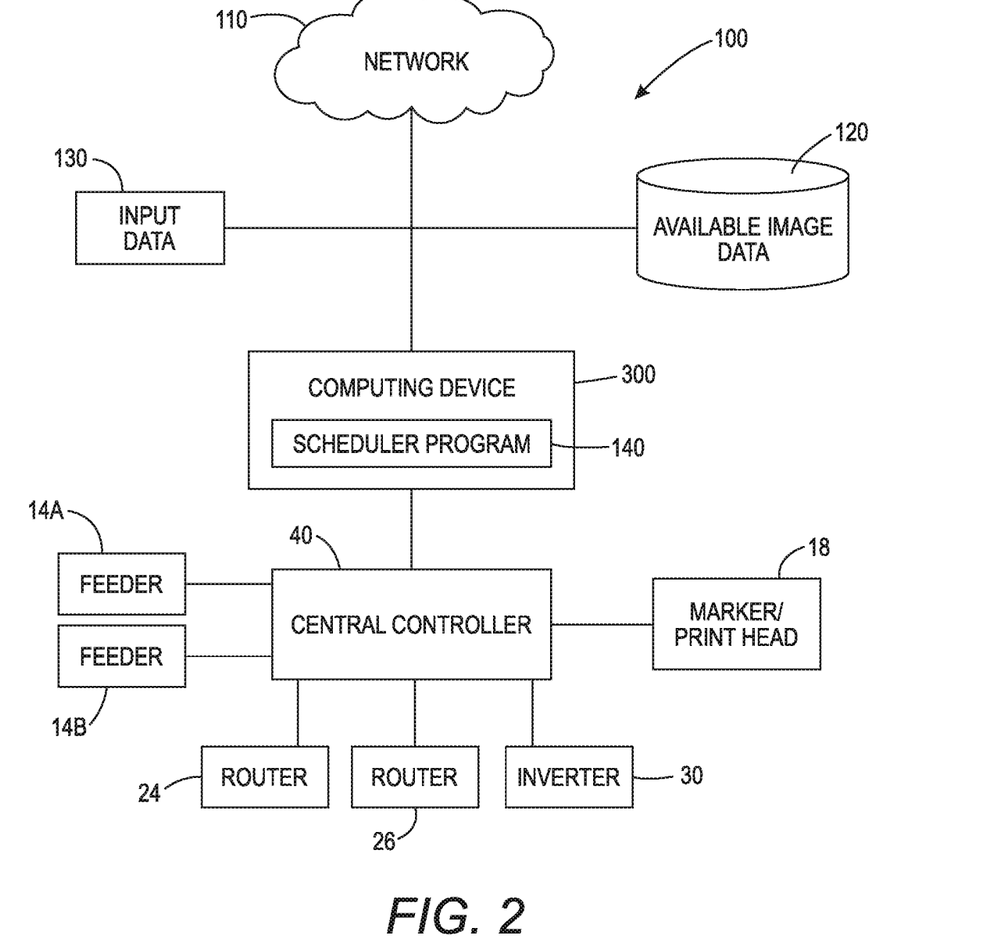
FIG. 2 is a functional block diagram illustrating an environment, in accordance with some embodiments of the present disclosure.

Referring now to the figures, FIG. 1 is a simplified elevational view showing the relevant parts of duplex printing system 10, in accordance with some embodiments of the present disclosure. Printing system 10 generally comprises one or more feeder trays (e.g., feeder trays 12A-B), one or more feeders (e.g., feeders 14A-B), duplex loop 16, marker or print head 18, one or more gates (e.g., 24 and 26), and inverter 30. Printing system 10 communicates with central controller 40 to implement the printing path schedule created by scheduler program 140. Printing system 10 is capable of simplex or duplex output, in which a stream of images (or digital video signals representative of images) desired to be printed causes the desired images to be formed on a selected side of a print sheet. The particular embodiment shown in FIG. 1 illustrates an ink-jet printer; however, it should be appreciated that the present disclosure could be implemented on other types of image-creation technologies, such as electrostatographic or xerographic printers.

Feeders 14A and 14B are operatively arranged to feed sheets on which to print images from feeder trays 12A and 12B to duplex loop 16, respectively. The sheets in feeder trays 12A and 12B may differ in, for example, size, color, or the presence of a pre-printed letterhead. When it is desired to create an image on a sheet, a sheet of a desired type is drawn from a feeder tray such as feeder tray 12A or feeder tray 12B, such as by respective feeders 14A or 14B, and the individual sheet is fed onto duplex loop 16. It should be appreciated that printing system 10 may comprise any number of feeders and feeder trays. Feeders 14A and 14B communicate with central controller 40 such that they feed sheets to duplex loop 16 in proper synchronization with the printing path schedule created by scheduler program 140 (see FIG. 2). For example, central controller 40 sends a signal to feeder 14A to feed three sheets from feeder tray 12A to duplex loop 16 at time $t_1$, time $t_2$, and time $t_3$, and a signal to feeder 14B to feed two sheets from feeder tray 12B to duplex loop 16 at time $t_4$ and $t_5$.

Duplex loop 16 generally comprises an endless belt which is capable, by means of friction, static electricity, vacuum, or other means, of retaining a plurality of sheets (e.g., sheets 20A-E) thereon, thereby retaining a particular sheet until it is time for the sheet to receive an image on the side of the sheet facing outwardly from the belt of the duplex loop 16. In the embodiment shown in FIG. 1, it is intended that sheets "ride" on the outer surface of the belt of the duplex loop 16. Along one portion of duplex loop 16, the belt of the duplex loop 16 comes into close contact with marker or print head 18, which may transfer an image onto the side of the sheet facing outwardly from the belt of duplex loop 16. In some embodiments, marker or print head 18 comprises one or more ink jet print heads. In some embodiments, marker or print head 18 comprises a photoreceptor belt, a transfer corotron, and an imager in accordance for use with toner (i.e., xerography). Marker 18 transfers the image onto a side of a sheet. If at this point the sheet having the image thereon is desired to be output from the system, a device such as gate 24, a simple design of which is shown in FIG. 1, but which may be of any number of designs known in the art, will cause the sheet to be disengaged from duplex loop 16 and output from printing system 10 such as through the path indicated by arrow 28. The output sheet can either be directly output into a tray for pickup by the user, or may be sent to a sorting or stapling device according to the larger architecture of the printing apparatus. In some embodiments, the sheet may be passed through a dryer as is known in the art.

To create a duplex print, that is, a print having one desired image on one side thereof and another desired image on the other side thereof, it is necessary to make the other side of the sheet available to marker 18, by causing the other side of the sheet to face outward while the sheet rides on the outside of duplex loop 16. For this purpose, printing system 10 comprises inverter 30 operatively arranged along duplex loop 16. Inverter 30 is operatively arranged to remove a sheet from duplex loop 16 which comprises an image already arranged on the outward-facing side thereof, and turn the sheet over so that the other, "non-printed" side of the sheet faces outward from the belt of duplex loop 16. Thus, inverter 30 removes the sheet from duplex loop 16, feeding it in one direction, and then delivering the sheet back to duplex loop 16 (as shown by the double-headed arrow next to inverter 30) to turn the sheet over (i.e., rotate the sheet 180°). Duplex loop 16 then re-feeds the sheet for another cycle so that marker 18 can place another desired image on the other side thereof. Gate 26 is operatively arranged to selectably cause the sheet to enter inverter 30, depending on whether the particular sheet passing therepast is a simplex print, the first side of a duplex print, or a second side of a duplex print.

As shown in FIG. 1, after a front side f image is placed on a sheet at marker 18, this sheet travels around duplex loop 16, is picked off duplex loop 16 by gate 26, inverted by inverter 30, and placed back on duplex loop 16, where the inverted sheet will again become available to receive an image from marker 18 at a time in the future after the inverted sheet makes its way around duplex loop 16. Thus, for a duplex print, the creation of the front side f image by marker 18 must be spaced by a fixed time period from the creation of the back side d image on the same sheet; this time difference is ultimately dependent on the size of the sheet relative to the overall length of duplex loop 16. Given a fixed-speed paper path, the only sheet-size-related difference is due to inverter 30; if a longer sheet has to be driven farther into inverter 30 to invert the sheet, the extra length in and out of the inverter 30 changes the length of the duplex path. Additionally, the longer duplex loop 16 is, the more time that will be required for the back side d of the sheet to come around to marker 18, and therefore a longer time spacing would be required between the outputting of the front side f image from marker 18 and the back side d image.

In a practical application of a duplex printer, an operating parameter which is more useful than the timing between the production of particular images is the number of "pitches" along the length of duplex loop 16. A "pitch" is a length of duplex loop 16 that corresponds to an image of the size to be printed, such as 8.5×11 inches or "A4." For example, as shown in FIG. 1, duplex loop 16 comprises a total length capable of holding a plurality of sheets. This space is broken down into sheet spaces or pitches. In some embodiments, duplex loop 16 comprises five pitches (or total available sheet spaces), pitches 22A-E. As such, duplex loop 16 is capable of holding a maximum of five sheets, sheets 20A-E, at a given moment in time. It is a desired feature of the present disclosure to optimize the printing output of printing system 10. Therefore, it is desired that all five pitches 22A-E are filled with a respective sheet 20A-E at all times. However, and as was described above, this is not always possible, especially with duplex printing, due to delays in the system. Thus, it is an object of the present disclosure to minimize the number of blank pitches or blank sheet spaces, and also to minimize the effect of delays in the system, as will be discussed in greater detail below.

FIG. 2 is a functional block diagram illustrating printing path adjustment environment 100, in accordance with some embodiments of the present disclosure. FIG. 1 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, printing path adjustment environment 100 includes computing device 300, a database or available image data 120, and user input data 130 all of which are connected to network 110. In some embodiments, printing path adjustment environment 100 further comprises central controller 40, which communicates with computing device 300 and/or scheduler program 140. Central controller 40 is the interface between scheduler program 140 (i.e., software) and the various relevant components of printing system 10 (hardware), as will be discussed in greater detail below.

Network 110 can be, for example, a local area network (LAN), a wide area network (WAN) such as the Internet, or a combination of the two, and can include wired, wireless, or fiber optic connections.

Computing device 300 may be a hardware device that produces printing schedules based on available image data 120 and/or input data 130 and adjusts printing schedules based on detected delays using scheduler program 140. Computing device 300 is capable of communicating with network 110, available image data 120, and input data 130. In some embodiments, computing device 300 may include a computer. In some embodiments, computing device 300 may include internal and external hardware components, as depicted and described in further detail with respect to FIG. 4. In some embodiments, scheduler program 140 is implemented on a web server, which may be a management server, a web server, or any other electronic device or computing system capable of receiving and sending data. The web server to can represent a computing system utilizing clustered computers and components to act as a single pool of seamless resources when accessed through a network. The web server may include internal and external hardware components, as depicted and described in further detail with respect to FIG. 4.

Scheduler program 140 receives requests for prints (e.g., duplex prints). Scheduler program 140 can receive requests for prints and generate a printing schedule based on those requests. For example, in some embodiments, print requests are sent to available image data 120 via input data 130 (e.g., from one or more users in a network). Scheduler program 140 communicates with available image data 120 to retrieve such print requests and then creates an optimized printing path schedule (i.e., a printing path schedule with the least number of unused pitches or sheet spaces on duplex loop 16). Scheduler program 140 can also detect delays in printing system 10, as previously discussed. Upon detection of one or more delays in printing system 10, scheduler program adjusts the printing path schedule to minimize the effect of the delay, as will be discussed in greater detail below. Scheduler program 140 communicates with central controller 40 to properly operate the hardware components of printing system in accordance with the created optimized printing path schedule and/or adjusted printing path schedule. Scheduler program 140 can generally include any software capable of generating a printing path schedule, subsequently adjusting that printing path schedule based on a detected delay in the printing system according to the present disclosure, and communicating with database 120, input record data 130, network 110, and central controller 40.

Available image data 120 is a central storage for printing requests (i.e., data that represents images to be printed on front side f and/or back side d of one or more sheets). Available image data 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, available image data 120 receives print requests from a user via input data 130. In some embodiments, available image data 120 contain a set of data related to print requests (e.g., generic images that may be used very frequently).

Input data 130 is data inputted by a user, for example, a duplex print request. The user may submit input data 130, or designate the appropriate data to be provided by available image data 120 (e.g., generic images that may be stored in available image data 120). The system, namely, printing path adjustment environment 100, is responsive to input data 130 provided by a user or read from available image data 120. As will be explained in greater detail below, scheduler program 140 receives a printing request from available image data 120 and/or input data 130 and generates a printing path schedule. Scheduler program 140 may further detect a delay in printing system 10, determine scheduling constraints based on the delay, and adjust the printing path schedule to minimize the effect of the delay.

Central controller 40 is the interface between scheduler program 140 and the hardware components of printing system 10. Central controller 40 communicates with scheduler program 140 to implement the optimized printing path schedule on printing system 10. For example, in some embodiments, central controller 40 may communicate with one or more feeders (e.g., feeders 14A-B), marker or print head 18, one or more gates (e.g., gates 24 and 26), inverter 30, to carry out the printing path schedule created by scheduler program.

Figure 3:
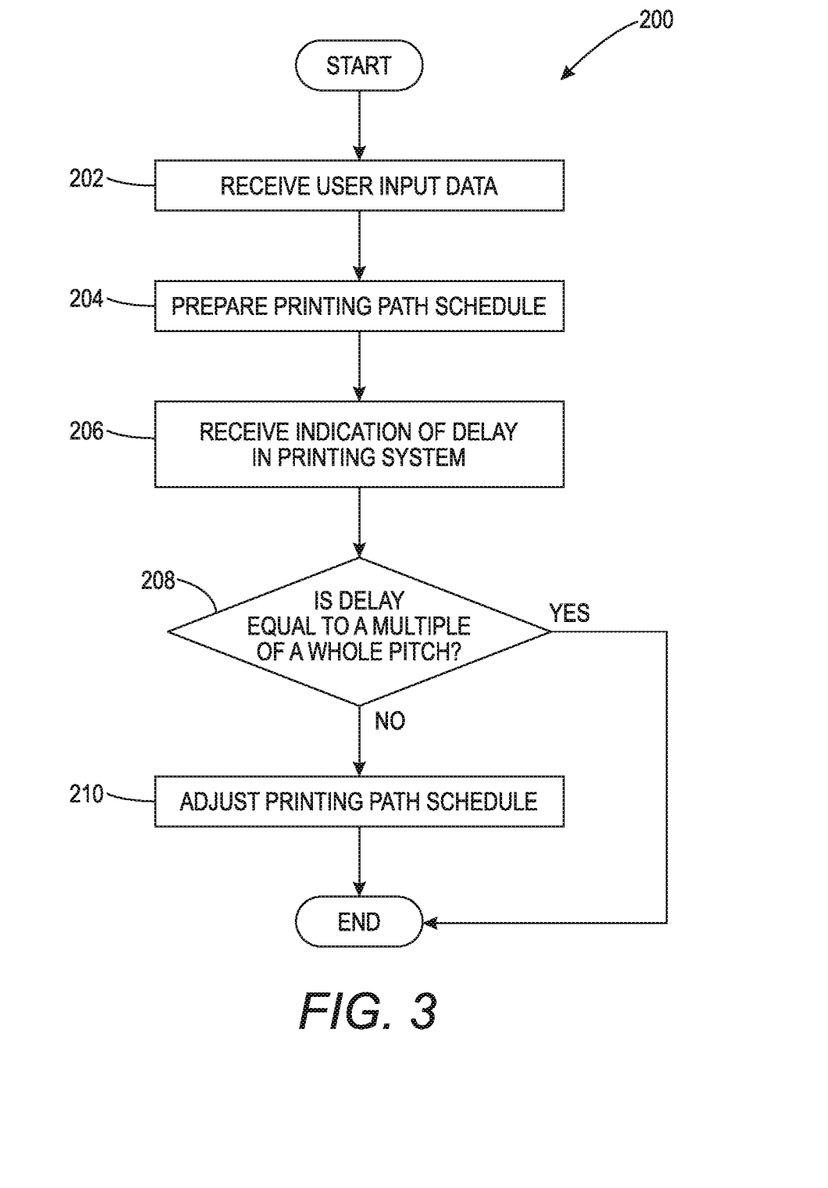
FIG. 3 is a flow chart depicting operational steps for adjusting a printing path schedule, in accordance with some embodiment of the present disclosure; and, FIG. 4 is a block diagram of internal and external components of a computer system, in accordance with some embodiments of the present disclosure.

FIG. 3 is a flow chart depicting operational steps for adjusting a printing path, in accordance with some embodiments of the present disclosure.

In step 202, scheduler program 140 receives one or more print requests. The print requests may come from continuous communication between scheduler program 140 and available image data 120 (i.e., scheduler program 140 continuously pulls image data from available image data 120 at a certain time interval, such as every five seconds), or from a specific signal sent from available image data 120 to scheduler program 140. In some embodiments, there are a plurality of print requests received by scheduler 140 at a given time or spread about one or more times.

In step 204, scheduler program 140 prepares a printing path schedule for the one or more print requests to be implemented on printing system 10 and sends that printing path schedule to central controller 40. As discussed in great detail above, scheduler program 140 may implement a printing path schedule using full burst mode or alternating mode, the goal being to minimize the number of blank pitches or prevent blank pitches altogether.

For example, if a print request requires five sheets with an image on both sides of each sheet (i.e., duplex print), scheduler program 140 may schedule the printing path in full burst mode. In full burst mode, scheduler program 140 creates a schedule that delivers five sheets from feeder tray 12A and/or feeder tray 12B to duplex loop 16 consecutively such that a front side f image is created on each of the sheets, and then pauses until each of the sheets receive a back side d image. An example of this is shown below:

$f_1 \, f_2 \, f_3 \, f_4 \, f_5 \, d_1 \, d_2 \, d_3 \, d_4 \, d_5$

In this example, scheduler program 140 sends the schedule to central controller 40, for example, in the form of one or more signals. Central controller 40 communicates with feeder 14A and/or feeder 14B to deliver five consecutive sheets to duplex loop 16. Central controller 40 communicates with marker 18 to apply a front side f image to each of the five sheets, gate 26/inverter 30 to invert each of the five sheets after a front side f image has been applied thereto, and marker 18 to apply a back side d image to each of the five sheets after they have been inverted. Central controller 40 also communicates with gate 24 to remove each of the five sheets from duplex loop 16 after a front side f image and a back side d image has been applied thereto.

In another example, if a print request requires five sheets with an image on both sides of each sheet (i.e., duplex print), scheduler program 140 may schedule the printing path in alternating mode. In alternating mode, scheduler program 140 creates a schedule that delivers five sheets from feeder tray 12A and/or feeder tray 12B to duplex loop 16 with one blank pitch in between each sheet such that a front side f image is created on each of the sheets. In this example, there is no need for feeders 14A-B to stop feeding paper to duplex loop 16 if additional duplex prints are needed. Put another way, sheets will be fed to duplex loop 16 leaving one blank pitch between them for a front side f image. As the sheets traverse duplex loop 16 for their back side d image, they will enter into the blank pitches. An example of this is shown below:

$f_1 \_ f_2 \_ f_3 \, d_1 \, f_4 \, d_2 \, f_5 \, d_3 \_ d_4 \_ d_5$

The benefit of alternating mode is an increase in prints per minute for duplex sheets. In this example, scheduler program 140 sends the schedule to central controller 40, for example, in the form of one or more signals. Central controller 40 communicates with feeder 14A and/or feeder 14B to deliver five sheets to duplex loop 16, with an intentional gap "_" arranged between each sheet. Central controller 40 communicates with marker 18 to apply a front side f image to each of the five sheets, gate 26/inverter 30 to invert each of the five sheets after a front side f image has been applied thereto, and marker 18 to apply a back side d image to each of the five sheets after they have been inverted. Central controller 40 also communicates with gate 24 to remove each of the five sheets from duplex loop 16 after a front side f image and a back side d image has been applied thereto.

In step 206, scheduler program 140 receives an indication of a delay in printing system 10. As previously discussed delays may occur that increase the time between sheets (i.e., delay the time that the scheduler delivers a sheet to the maker paper path). For example, from a late print job submission when streaming, a shift between paper feeders, an adjustment to the marker, additional time needed by a finisher or other downstream device, a delay in submission between print jobs, a mix of duplex and simplex jobs, etc.

A sheet delayed for a whole number of pitches (e.g., one full pitch), in full burst mode, may be shown as:

$f_1 \, X \, f_2 \, f_3 \, f_4 \, d_1 \, f_5 \, d_2 \, d_3 \, d_4 \_ d_5$ with "X" representing a delay that represents one full pitch and "_" representing an intentional gap representing one full pitch. As shown, the intentional gap "_" left by scheduler program following back side $d_4$ image can then be filled with a front side $f_6$ image of a sixth sheet, if desired. Thus, the whole pitch delay does not proliferate further down the sequence in full burst mode, as discussed above.

A sheet delayed for a fractional number of a pitches (e.g., one and one half pitches), in full burst mode, may be shown as:

$f_1 \, f_2 \, Xx \, f_3 \, . \, d_1 \, d_2 \, f_4 \, . \, d_3 \, f_5 \_ . \, d_4 \_ . \, d_5$ with "X" representing a full pitch delay, "x" representing a fraction of a pitch delay, "_" representing an intentional gap representing one full pitch, and "." representing an intentional delay, wherein "." plus "x" equals one full pitch. As shown, the fractional pitch delay "x" results in the implementation of an intentional gap "." representing the fractional pitch delay further down the sequence in full burst mode.

A sheet delayed for an even number of pitches (e.g., two full pitches), in alternating mode, may be shown as:

$f_1 \_ X \, X \, f_2 \, d_1 \, f_3 \_ f_4 \, d_2 \, f_5 \, d_3 \_ d_4 \_ d_5$ with "X" representing a delay that represents one full pitch and "_" representing an intentional gap representing one full pitch. As shown, the intentional gap "_" left by scheduler program following back side $d_3$ image can then be filled with a front side $f_6$ image of a sixth sheet, if desired. Thus, the two pitch delay does not proliferate further down the sequence in alternating mode, as discussed above.

A sheet delayed for a fraction of a pitch (e.g., one half pitch), in alternating mode, may be shown as:

$f_1 \_ x \, f_2 \_ . \, d_1 \, f_3 \, . \, d_2 \, f_4 \_ . \, d_3 \, f_5 \, . \, d_4 \_ \_ . \, d_5$ with "x" representing a fraction of a pitch delay, "_" representing an intentional gap representing one full pitch, and "." representing an intentional fractional delay wherein "." plus "x" equals one full pitch. As shown, the fractional pitch delay "x" results in the implementation of an intentional gap "." representing the fractional pitch delay further down the sequence in alternating mode.

In step 208, scheduler program 140 determines one or more scheduling constraints to apply to the printing path schedule to minimize the effect of the delay further down the sequence of the printing patch schedule. Since the effect of the delay only proliferates further down the sequence with respect to fractional pitch delays and not with whole pitch delays, scheduler program 140 first determines if the delay is representative of a whole or a fraction of a pitch.

If, in step 208, scheduler program 140 determines that the delay is equal to a multiple of one whole pitch, scheduler program 140 does not adjust the printing path schedule. As previously described, a whole pitch delay does not proliferate further down the printing schedule (i.e., does not create additional or repetitive delays).

If, in step 208, scheduler program 140 determines that the delay is representative of a fraction of a pitch, then in step 210, scheduler program 140 adjusts the printing path schedule. Specifically, scheduler program 140 adjusts printing path schedule by including an intentional gap that, when combined with the fractional delay, equals one whole pitch.

For example, to correct the fractional pitch delay in full burst mode, scheduler program 140 will issue an additional intentional gap to round the fractional pitch delay to a whole pitch. Thus the additional intentional gap "a" is calculated as: a=1−x, wherein "a" is a fraction of a pitch, "x" is a fraction of a pitch, and a+x=one whole pitch. Thus, the correction of the example shown above by scheduler program 140 may be shown as:

$$f_1\ f_2\ X\ x\ a\ f_3\ d_1\ d_2\ f_4\ f_5\ d_3\ \_\ \_\ d_4\ d_5$$

Additional sheets (e.g., sheets six and seven) may be added in the blank pitches following back side $d_3$ if desired. As such, the fractional delay x does not continue further down the schedule.

In another example, to correct the fractional pitch delay in alternating mode, scheduler program 140 will issue an additional intentional fractional pitch gap "a" to round the fractional pitch delay to a whole pitch, and also issue an additional whole pitch gap. The additional intentional gap for alternating mode is thus equal to "a+_" and is necessary to properly align the front side f images and back side d images on respect sheets. Thus, the correction of the example shown above by scheduler program 140 may be shown as:

$$f_1\ \_\ x\ a\ \_\ f_2\ d_1\ f_3\ \_\ f_4\ d_2\ f_5\ d_3\ \_\ d_4\ \_\ d_5$$

Additional sheets (e.g., sheets six and seven) may be added in the blank pitches following back side $d_3$ and back side $d_4$, respectively, if desired. As such, the fractional delay x does not continue further down the schedule.

It should be appreciated that in step 210, scheduler program 140 adjusts the printing path schedule by adding intentional gaps that round the delay up to a multiple of a whole pitch (i.e., scheduler program 140 augments the print printing path schedule in step 210).

Figure 4:
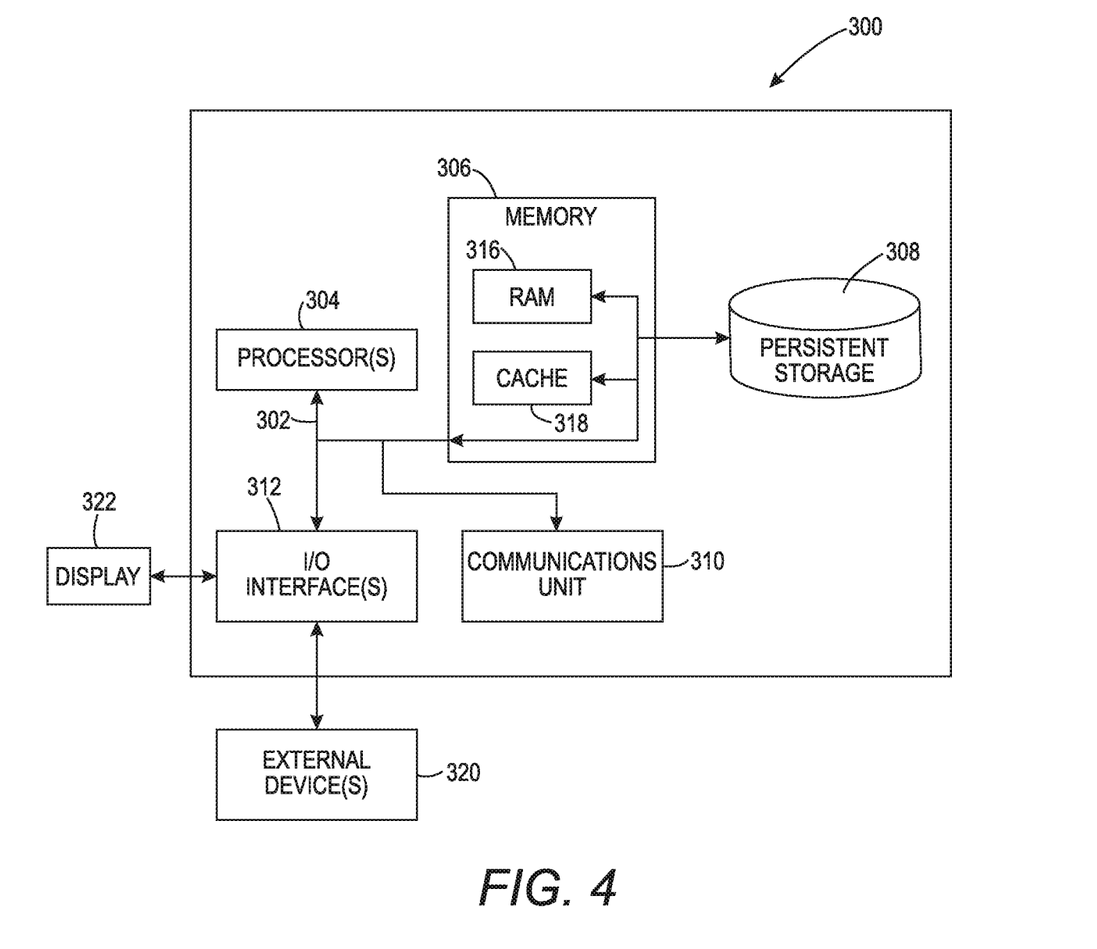

FIG. 4 is a block diagram of internal and external components of computing system 300, which is representative of the computing device of FIG. 2, in accordance with an embodiment of the present disclosure. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Printing system
12A Feeder tray
12B Feeder tray
14A Feeder
14B Feeder
16 Duplex loop
18 Marker (or print head)
20A Sheet
20B Sheet
20C Sheet
20D Sheet
20E Sheet
22A Pitch (or sheet space)
22B Pitch (or sheet space)
22C Pitch (or sheet space)
22D Pitch (or sheet space)
22E Pitch (or sheet space)
24 Gate
26 Gate
28 Arrow
30 Inverter
40 Central controller
100 Printing path adjustment environment
110 Network
120 Available image data
130 Input data
140 Scheduler program
200 Flow chart
202 Step
204 Step
206 Step
208 Step
210 Step
300 Computing device
302 Communications fabric
304 Processing units
306 Memory
308 Persistent storage
310 Communications unit
312 Input/output (I/O) interfaces
316 Random access memory (RAM)
318 Cache memory
320 External device(s)
322 Display

What is claimed is:

1. A method of operating a printing system according to a printing path schedule, the printing system comprising a duplex loop including a plurality of pitches with each pitch of the plurality of pitches operatively arranged to carry one sheet, the method comprising:
receiving, by one or more computer processors, input data related to one or more images to be printed;
preparing, by the one or more computer processors, a printing path schedule based on the input data;
receiving, by the one or more computer processors, an indication of a delay in the printing system;
determining, by the one or more computer processors, whether the delay is equal to a multiple of a whole pitch of the plurality of pitches; and,
if the delay is not equal to a multiple of a whole pitch of the plurality of pitches, adjusting, by the one or more computer processors, the printing path schedule.

2. The method as recited in claim 1, wherein the step of adjusting the printing path schedule comprises:
determining, by the one or more computer processors, a value of the delay; and,
adding, by the one or more computer processors, an intentional gap in the printing path schedule, wherein the addition of the delay and the intentional gap is equal to a multiple of a whole pitch.

3. The method as recited in claim 2, wherein the step of adding an intentional gap in the printing schedule comprises:
delaying, by the one or more computer processors, the delivery of a sheet in the printing path schedule to the duplex loop by a time equal to a value of the intentional gap.

4. The method as recited in claim 2, wherein the intentional gap is equal to the difference between one pitch and the delay.

5. The method as recited in claim 2, wherein the intentional gap is equal to a whole pitch added to the difference between one pitch and the delay.

6. The method as recited in claim 1, wherein the step of preparing a printing path schedule based on the input data comprises:
determining, by the one or more computer processors, a number of sheets on which the one or more images are to be printed;
determining, by the one or more computer processors, a printing mode; and,
sending, by the one or more computer processors, the printing path schedule to the printing system.

7. The method as recited in claim 6, wherein the step of determining a printing mode comprises:
based on the number of sheets and a number of the plurality of pitches, selecting, by the one or more computer processors, a full burst printing mode.

8. The method as recited in claim 6, wherein the step of determining a printing mode comprises:
based on the number of sheets and a number of the plurality of pitches, selecting, by the one or more computer processors, an alternating printing mode.

9. The method as recited in claim 6, wherein the step of sending the printing path schedule to the printing system comprises:
sending, by the one or more computer processors, the printing path schedule to a central controller of the printing system; and,
delivering, by a feeder of the printing system, the number of sheets to the duplex loop.

10. A computer system for operating a printing system according to a printing path schedule, comprising:
a printing system, comprising:
a duplex loop including a plurality of pitches, each pitch of the plurality of pitches operatively arranged to carry one sheet;
an inverter; and,
at least one feeder;
one or more computer processors;
one or more computer readable storage media;

program instructions stored on the computer readable storage media for execution by at least one of the one or more computer processors, the program instructions comprising:

program instructions to receive input data related to one or more images to be printed;

program instructions to prepare a printing path schedule based on the input data;

program instructions to receive an indication of a delay in the printing system;

program instructions to determine whether the delay is equal to a multiple of a whole pitch of the plurality of pitches; and, program instructions to, if the delay is not equal to a multiple of a whole pitch of the plurality of pitches, adjust the printing path schedule.

11. The computer system as recited in claim 10, wherein the program instructions to adjust the printing path schedule comprise:

program instructions to determine a value of the delay; and, program instructions to add an intentional gap in the printing path schedule, wherein the addition of the delay and the intentional gap is equal to a multiple of a whole pitch.

12. The computer system as recited in claim 11, wherein the program instructions to add the intentional gap in the printing schedule comprise:

program instructions to delay the delivery of a sheet by the at least one feeder to the duplex loop by a time equal to a value of the intentional gap.

13. The computer system as recited in claim 11, wherein the intentional gap is equal to the difference between one pitch and the delay.

14. The computer system as recited in claim 11, wherein the intentional gap is equal to a whole pitch added to the difference between one pitch and the delay.

15. The computer system as recited in claim 10, wherein the program instructions to prepare a printing path schedule based on the input data comprise:

program instructions to determine a number of sheets on which the one or more images are to be printed;

program instructions to determine a printing mode; and, program instructions to send the printing path schedule to the printing system.

16. The computer system as recited in claim 15, wherein the program instructions to determine a printing mode comprise:

based on the number of sheets and a number of the plurality of pitches, program instructions to select a full burst printing mode.

17. The computer system as recited in claim 15, wherein the program instructions to determine a printing mode comprise:

based on the number of sheets and a number of the plurality of pitches, program instructions to select an alternating printing mode.

18. The computer system as recited in claim 15, wherein the program instructions to send the printing path schedule to the printing system comprise:

program instructions to send the printing path schedule to a central controller of the printing system; and, program instructions to deliver the number of sheets to the duplex loop using the one or more feeders.

19. A computer program product for operating a duplex printing system according to a duplex printing path schedule, the printing system comprising a duplex loop including a plurality of pitches with each pitch of the plurality of pitches operatively arranged to carry one sheet, the computer program product comprising:

a computer readable storage medium and program instructions stored on the computer readable storage medium, the program instructions comprising:

program instructions to receive input data related to one or more images to be printed;

program instructions to prepare a printing path schedule based on the input data, wherein the printing patch schedule comprises one of a full burst printing mode and an alternating printing mode;

program instructions to receive an indication of a delay in the printing system;

program instructions to determine whether the delay is equal to a multiple of a whole pitch of the plurality of pitches; and, program instructions to, if the delay is not equal to a multiple of a whole pitch of the plurality of pitches, adjust the printing path schedule by adding an intentional gap in the printing path schedule, wherein the addition of the delay and the intentional gap is equal to a multiple of a whole pitch.

20. The computer program product as recited in claim 19, wherein the program instructions to adjust the printing path schedule comprise:

program instructions to delay the delivery of a sheet by at least one feeder of the printing system to the duplex loop by a time that corresponds to a value of the intentional gap.

\* \* \* \* \*